Oct. 4, 1938.   H. W. RIBBLE   2,131,785
DISPENSING FAUCET
Filed June 18, 1937
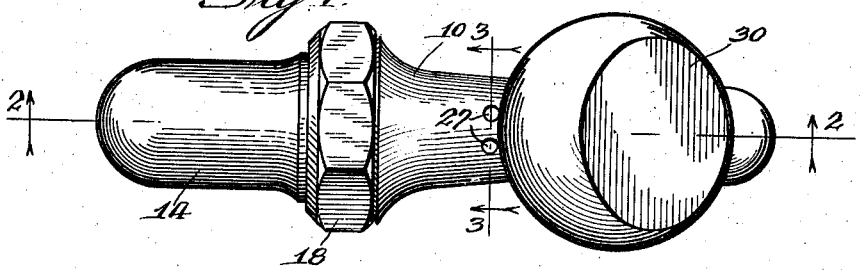
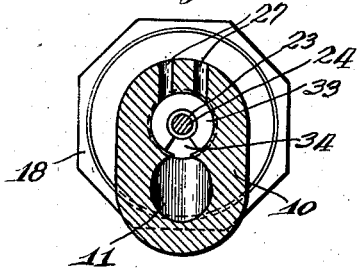
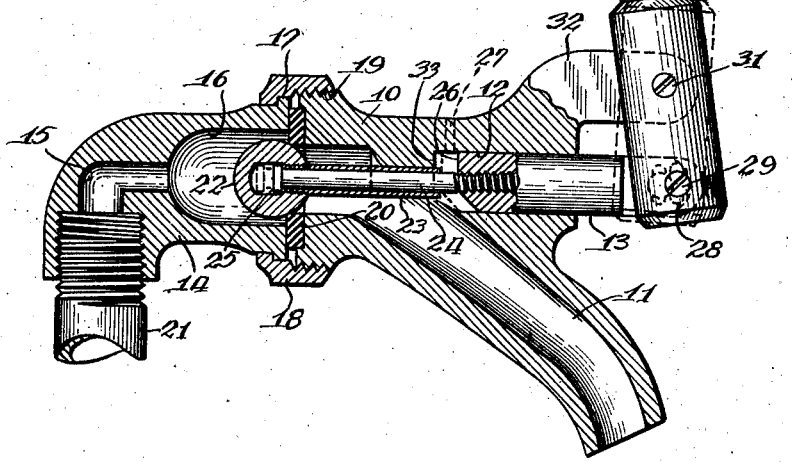

Patented Oct. 4, 1938

2,131,785

UNITED STATES PATENT OFFICE 2,131,785

DISPENSING FAUCET

Harry W. Ribble, Niles Center, Ill., assignor, by mesne assignments, to Rapids Equipment Co. Inc., Cedar Rapids, Iowa, a corporation of Iowa Application June 18, 1937, Serial No. 148,873

7 Claims. (Cl. 225—5)

My invention relates to flow controlling faucets, more particularly to quick-acting beverage-dispensing faucets, and has for an object the provision of a simple, reliable and inexpensive device of this character.

Various types of faucets have heretofore been provided for dispensing beverages under pressure, such, for example, as beer or other beverages containing dissolved gases. In order to provide efficient delivery of the beverage without waste thereof, the faucet must include quick opening and tight sealing valve means so as to obtain prompt supply of the beverage when the faucet is operated, and at the same time prevent dripping and waste upon closure of the faucet. Furthermore, when dispensing beer it is important that a free, full flow of the beverage be obtained in order to prevent formation of excess foam, as is likely to occur if the beer is unduly agitated.

Some difficulty has heretofore been encountered with beer dispensing faucets due to the fact that at the instant of closure of the valve means, which valve means are usually located a considerable distance from the discharge end of the faucet, a quantity of beer is trapped in the discharge passageway of the faucet between the end thereof and the valve means. Since this entrapped beer after closure of the valve means is contained in a tightly sealed passageway which is open only at the bottom, the entrapped beer can flow out of the faucet only if sufficient air bubbles upwardly through the beer to prevent the formation of a vacuum at the upper end of the tightly sealed passageway. Entrance of air into the beer-filled passageway in this manner of course causes considerable disturbance of the beer and also causes the beer to issue from the open end of the faucet in an unsteady or jerky stream so as to disturb the beer in the glass and cause additional excess foam.

Something is yet to be desired, therefore, in quick-acting beer-dispensing faucets of this character, and it is accordingly a further object of my invention to provide a quick-acting beer-dispensing faucet having vent means for admitting air to the dispensing passageway of the faucet adjacent the outlet side of the valve means so as to prevent air locks in the faucet after closure of the valve.

It is a still further object of my invention to provide a faucet of this character having operating means for closing the vent means prior to opening of the valve means so as to prevent leakage of the beverage through the vent means, the operating means being arranged to open the vent means immediately upon or after closure of the valve means.

In carrying out my invention in one form, I provide a quick-acting beverage-dispensing faucet including beverage supply means, beverage outlet means, and valve means between the supply and outlet means for controlling the flow of beverage therethrough. Adjacent the valve means I provide vent means communicating with the outlet means for preventing an air lock upon closure of the valve means, and means are provided for operating the valve means and for effecting closure of the vent means prior to opening of the valve means and for effecting opening of the vent means immediately upon closure of the valve means.

More specifically, my improved dispensing faucet comprises a head having a pair of intersecting passageways one of which constitutes a beverage-dispensing passageway, and a connecting member having a supply passageway for connecting the dispensing passageway to a supply of beverage under pressure. Means are provided for tightly sealing the connecting member to the head, which means includes a sealing washer, and a valve head is disposed in the supply passageway arranged normally to be held in sealing engagement with the washer by the pressure of the beverage, the valve head and the washer thereby providing valve means for controlling the flow of beverage through the dispensing passageway. Extending outwardly from the valve head through the aperture in the washer I provide a valve stem, and a reciprocable member slidably supported in the other of the intersecting passageways in the faucet head is provided with a portion for slidably supporting the valve stem. Spaced apart shoulder means on the reciprocable member provide a lost-motion connection with the valve stem for operating the valve means, and the reciprocable member is arranged to control vent means arranged to connect the dispensing passageway to atmosphere at a point remote from its discharge end. Means are provided for operating the reciprocable member longitudinally of its supporting passageway, and the lost motion connection with the valve stem provides for closure of the vent means by the reciprocable member prior to opening of the valve means, and for opening of the vent means immediately subsequent to closure of the valve means.

For a more complete understanding of my invention reference should now be had to the drawing, in which:

Fig. 1 is a plan view of a quick-acting dispensing faucet embodying my invention;

Fig. 2 is a cross sectional view taken along the line 2—2 of Fig. 1, certain parts being shown in elevation more clearly to illustrate the constructional details; and Fig. 3 is a cross sectional view taken along the line 3—3 of Fig. 1.

Referring now to the drawing, I have shown my invention as applied to a dispensing faucet comprising a cast head 10 having a pair of intersecting passageways 11 and 12 therein, the passageway 11 constituting a beverage dispensing passageway provided with a discharge opening at its lower end, and the passageway 12 constituting a guide-bearing for a reciprocable member 13, the function and operation of which will be more fully described hereinafter. In addition, the dispensing faucet includes a connecting member 14, having a supply passageway therethrough which includes a restricted portion 15 and an enlarged portion 16 adjacent one end thereof. In order to tightly seal the connecting member 14 to the head 10, the connecting member 14 is provided with an outwardly extending flange 17 arranged to be engaged by a sealing nut 18 which is internally threaded cooperatively to engage a threaded portion 19 of the head 10, and a sealing washer 20, preferably formed of rubber or similar material, is arranged between the sealing member 14 and the head 10 so as to be tightly clamped therebetween when the sealing nut 18 is tightened. Adjacent its other end the connecting member 14 is internally threaded, as shown, cooperatively to engage a beverage line or pipe 21 which extends from a suitable source of beverage maintained under pressure so as to supply beverage to the dispensing passageway 11.

In order to properly control the flow of beverage through the dispensing pasageway 11, I provide a spherical valve head or ball valve 22 which is disposed in the enlarged portion 16 of the supply passageway and arranged normally to be held in sealing engagement with the sealing washer 20 by the pressure of the beverage in the supply passageway. This valve head 22 is hollow, as shown in Fig. 2, and is internally threaded for cooperative engagement with a hollow tubular valve stem 23 which extends through the aperture in the washer 20 into the upper end of the dispensing passageway 11. As shown, the tubular valve stem 23 surrounds and is slidably supported on a rod 24 which constitutes an extending portion of the reciprocable member 13, the rod 24 and the reciprocable member 13 preferably being threadedly connected, as shown, to facilitate assembly of the parts 13, 22, 23, and 24 in the passageways of the head 10. The outermost end of the rod 24 extends into the hollow space within the valve head 22, as shown, and is provided with a flange 25 which constitutes a shoulder for abuttingly engaging the adjacent end of the tubular valve stem 23, and the end of the reciprocable member 13 from which the rod 24 extends constitutes a second shoulder 26 for abuttingly engaging the opposite end of the tubular valve stem 23, the shoulders 25 and 26 being spaced apart a distance somewhat greater than the length of the tubular stem 23 so as to provide a lost-motion connection between the reciprocable member 13 and the valve head 22.

Extending through the upper portion of the head 10 I provide a pair of apertures 27 which intersect the passageway 12 adjacent its intersection with the dispensing passageway 11, so as to constitute vent means for connecting the dispensing passageway 11 to atmosphere. As will be apparent upon inspection of Fig. 2, the longitudinal movement of the reciprocable member 13 in the passageway 12 controls the vent passageways 27, the inner end of the member 13 moving across the passageways 27 so as to close and open the same.

Adjacent its outer end the reciprocable member 13 is provided with a slot 28 for receiving a pin 29 carried by an operating handle 30, and this handle 30 is pivotally supported on a pin 31 carried by an ear 32 extending outwardly from the head 10. Preferably, the handle 30 is provided with a slot adjacent its lower end for receiving the supporting ear 32 and the outermost end of the reciprocable member 13.

Having in mind the constructional details thus far described, it is believed that a complete understanding of my invention may now be had from a description of the operation. In Fig. 2, the valve head 22 is shown in its closed position, which corresponds to the position of the handle 30 shown in heavy lines, and it will be observed that in this position of the valve head 22 and the handle 30 the vent passageways 27 are open so as to connect the dispensing passageway 11 to atmosphere adjacent its upper end at a point remote from its lower discharge end. In order to open the valve means so as to draw beverage from the faucet, it is necessary only to move the upper end of the handle 30 in a clockwise direction about its pivot 31 from the heavy line position shown. As the operating handle 30 is moved in this direction the reciprocable member 13 is of course moved in a left-hand direction along the guide-bearing passageway 12, and when the handle 30 reaches the position shown in broken lines, the reciprocable member 13 and its extending rod 24 occupy the respective positions shown in broken lines, and it will be observed that the movement thus far obtained is not effective to open the valve means. It will likewise be observed, however, that movement of the reciprocable member 13 to the position indicated by the broken lines is effective to close the vent passageways 27 so as to prevent leakage of beverage therethrough when the valve does open. Further movement of the operating handle 30 in a clockwise direction about its pivot is now effective to move the valve stem 23 and the valve 22 in a left-hand direction so as to open the valve and permit the flow of beverage into the dispensing passageway 11 from the supply passageway 15, this movement of the valve head 22 being accomplished by the abutting engagement of the shoulder 26 on the reciprocable member 13 with the adjacent end of the tubular valve stem 24. In order to limit positively the opening movement of the handle 30 and the valve head 22, the guide passageway 12 is provided with an inwardly extending shoulder 33 for abuttingly engaging the shoulder 26 on the reciprocable member 13. This shoulder 33, which forms a restricted portion in the passageway 12, as shown, and which serves to guide and support the outermost end of the tubular valve stem 23, is cut-away adjacent the bottom of the passageway as shown best in Fig. 3, the cut-away portion being indicated by the reference numeral 34. The purpose of this cut-away portion 34 is to prevent the entrapment of beer behind the shoulder 33 thereby to eliminate any tendency of entrapped beer to be forced between the reciprocable member 13 and the wall of the passageway 12 during movement of the member 13.

It will thus be seen that the operating means for my improved faucet is arranged to close the vent means 27 before the valve means comprising the washer 20 and the valve head 22, is opened. In order now to close the valve means, it is necessary only to move the upper end of the handle 30 in the opposite or counter-clockwise direction back toward the heavy line position shown, and it will be apparent that the pressure of the beverage on the valve head 22 may be such as to cause the valve head to follow the reciprocable member 13 and the rod 24 so that when these members reach the dotted line positions shown, the valve head 22 may again occupy the closed position, shown, in sealing engagement with the washer 20. If, however, the pressures on the opposite sides of the valve head 22 are such that the valve head does not follow the rod 24 and the reciprocable member 13, the flange 25 on the rod 24 abuttingly engages the inner end of the valve stem 23 so that further movement of the operating handle 30 from the broken line position to the full line position positively operates the valve head 22 to its closed position. This further movement of the handle 30 of course effects movement of the reciprocable member 13 and the rod 24 to the respective full line positions shown, so as immediately to open the vent passageways 27, the flange or shoulder 25 on the rod 24 and the end of the valve stem 23 providing a positive stop for limiting the closing movement of the handle 30.

It will thus be apparent that closure of the valve means and opening of the vent passageways 27 are accomplished substantially simultaneously to connect the upper portion of the dispensing passageway 11 to atmosphere, and thus provide for the free flow from the dispensing passageway 11 of the beer entrapped therein upon closure of the valve means. Even when the pressures on the valve head 22 are such as to effect closure of the valve means when the handle 30 reaches the broken line position, as indicated above, the movement of the handle ordinarily takes place so quickly that the immediately subsequent opening of the vent means is substantially simultaneous with the closure of the valve means.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. A quick-acting, beverage-dispensing faucet comprising a beverage supply passageway, a beverage outlet passageway, valve means between said supply passageway and said outlet passageway movable between an open and a closed position, vent means including an aperture in one wall of said outlet passageway adjacent said valve means for preventing an air lock in said outlet passageway upon closure of said valve means, means for operating said valve means, and means associated with said operating means for closing said aperture prior to opening of said valve means and for opening said aperture upon closure of said valve means.

2. A quick-acting, beverage-dispensing faucet comprising a supply passageway, a communicating outlet passageway, valve means between said passageways movable between open and closed positions, vent means consisting entirely of apertures in one wall of said outlet passageway for admitting air thereto, means for opening and closing said apertures, and a lost-motion connection between said last mentioned means and said valve means for opening said valve means subsequent to closure of said apertures and for effecting substantially simultaneous closure of said valve means and opening of said apertures.

3. A quick-acting, beverage-dispensing faucet comprising a supply passageway, an outlet passageway communicating with said supply passageway, valve means between said passageways including a valve head having a stem extending into said outlet passageway, vent means communicating with said outlet passageway, a reciprocable member for opening and closing said vent means including an extending portion slidably engaging said stem, and cooperating spaced apart shoulders on said reciprocable member and said valve means arranged for abutting engagement upon movement of said reciprocable member to effect movement of said valve means between open and closed positions, said spaced apart shoulders providing a lost-motion connection whereby said vent means is closed by said reciprocable member prior to opening of said valve means and said valve means is closed substantially simultaneously with the opening of said vent means.

4. A quick-acting, beverage-dispensing faucet comprising a supply passageway, an outlet passageway communicating with said supply passageway, valve means between said passageways including a spherical valve head having a hollow stem extending into said outlet passageway, vent means communicating with said outlet passageway adjacent said valve means, a reciprocable member including an extending portion slidable through said hollow stem, means for operating said reciprocable member between two positions to open and close said vent means, and cooperating spaced apart shoulders on said reciprocable member and said valve means providing a lost-motion connection therebetween for operating said valve means between open and closed positions in response to movement of said reciprocable member between said two positions, said lost-motion connection providing for closure of said vent means prior to opening of said valve means and for closure of said valve means substantially simultaneously with the opening of said vent means.

5. A quick-acting, beverage-dispensing faucet comprising a head having a pair of communicating passageways one of which constitutes a dispensing passageway and the other of which constitutes a guide bearing, vent means communicating with said guide bearing passageway adjacent the intersection of said passageways, a reciprocable member in said guide bearing passageway substantially sealing the same and movable to open and close said vent means, a valve stem slidably supported by said reciprocable member for limited movement with respect thereto, valve means controlled by said valve stem for controlling the flow of beverage through said dispensing passageway, and means for operating said reciprocable member to open and close said vent means and said valve means, the limited movement between said valve stem and said reciprocable member providing for closure of said vent means prior to opening of said valve means and closure of said valve means 6. A quick-acting, beverage-dispensing faucet comprising a head having a pair of communicating passageways one of which constitutes a dispensing passageway and the other of which constitutes a guide bearing, vent means communicating with said guide bearing passageway adjacent the intersection of said passageways, a reciprocable member in said guide bearing passageway substantially sealing the same and movable to open and close said vent means, said reciprocable member having a portion of reduced cross section extending into said dispensing passageway, a hollow valve stem surrounding said reduced portion for slidable movement thereon, means for limiting the relative movement between said stem and said portion, valve means in said dispensing passageway for controlling the flow of beverage therethrough including a valve head carried by said valve stem, said vent means being disposed on the outlet side of said valve means, and means for operating said reciprocable member, said limited movement between said valve stem and said member providing for closure of said vent means prior to opening of said valve means to prevent the escape of beverage through said vent means, and for opening of said vent means upon closure of said valve means to admit air to said dispensing passageway whereby a free flow of beverage therefrom is obtained.

7. A quick-acting, beverage-dispensing faucet comprising a head having a pair of intersecting passageways one of which constitutes a beverage dispensing passageway, a connecting member having a supply passageway for connecting said dispensing passageway to a supply of beverage under pressure, means for sealing said connecting member to said head including a washer, a valve head in said supply passageway arranged normally to be held in sealing engagement with said washer by the pressure of said beverage, said valve head and said washer providing valve means for controlling the flow of beverage through said dispensing passageway, a valve stem extending from said valve head through the aperture in said washer, a reciprocable member slidably supported in the other of said intersecting passageways having a portion slidably supporting said valve stem, spaced apart shoulder means on said reciprocable member providing a lost-motion connection with said valve stem for operating said valve means, means for operating said reciprocable member, and vent means controlled by said reciprocable member for connecting said dispensing passageway to atmosphere at a point remote from its discharge end, said lost-motion connection providing for closure of said vent means prior to opening of said valve means and for opening of said vent means upon closure of said valve means.

HARRY W. RIBBLE.